No. 671,121. Patented Apr. 2, 1901.
W. H. TUTTLE.
MEANS FOR FASTENING RESILIENT TIRES TO WHEELS.
(Application filed May 14, 1900.)
(No Model.)
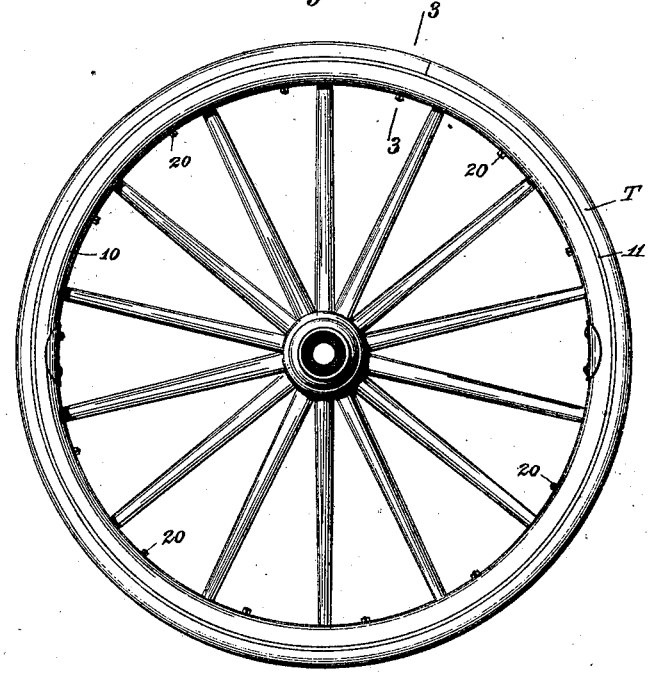
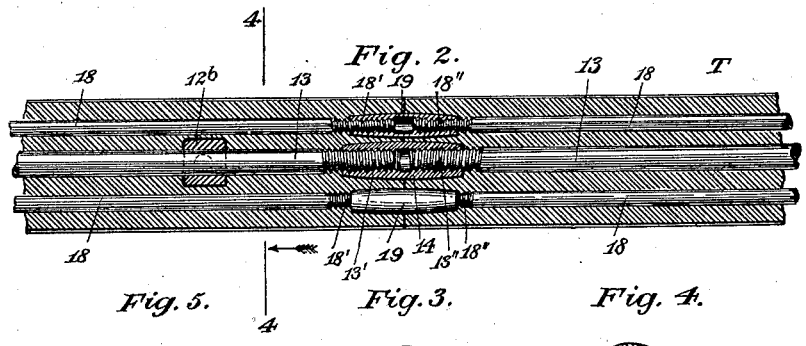
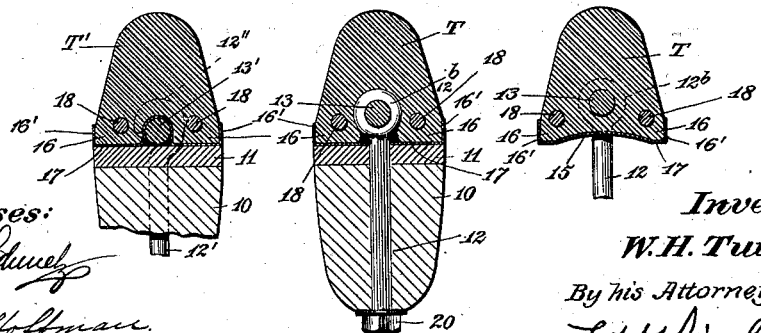
Witnesses:
Chas. P. ___
Geo. F. Hoffman.
Inventor
W. H. Tuttle,
By his Attorney
F. H. Richards.

UNITED STATES PATENT OFFICE.

WILLIAM H. TUTTLE, OF HARTFORD, CONNECTICUT.

MEANS FOR FASTENING RESILIENT TIRES TO WHEELS.

SPECIFICATION forming part of Letters Patent No. 671,121, dated April 2, 1901.

Application filed May 14, 1900. Serial No. 16,555. (No model.)

*To all whom it may concern:*

Be it known that I, WILLIAM H. TUTTLE, a citizen of the United States, residing at Hartford, in the county of Hartford and State of Connecticut, have invented certain new and useful Improvements in Means for Fastening Resilient Tires to Wheels, of which the following is a specification.

This invention relates to means for securing resilient tires to wheels of vehicles; and it has for its object the provision of such a tire which is adapted to be placed on the wheel properly without the necessity of removing the usual metal tire therefrom and to be firmly held in place on the metal tire, as will hereinafter be described.

In the accompanying drawings, Figure 1 is a side view of a wheel having a resilient tire applied thereto in accordance with one form of my invention. Fig. 2 represents a longitudinal section of one form of the tire, illustrating the construction of the same. Fig. 3 is a transverse section of the wheel-rim, taken on line 3 3, Fig. 1. Fig. 4 is a cross-section of the tire, showing it in the condition before it is placed on the wheel. Fig. 5 represents a modification of the tire.

Similar characters designate like parts in all the figures of the drawings.

In the drawings, 10 designates the felly of a wheel, having the usual metal tire 11, held in place thereon by bolts which pass through the felly and are engaged by nuts at their inner ends.

When it is desired to place a resilient tire in position on a wheel, it has heretofore been the practice to remove the metal tire and to attach the rubber or other resilient tire to the felly in various ways, and this procedure is not only expensive, but often results in said resilient tire being insecurely retained in position.

In one embodiment of my invention bolts 12 are provided, having at their outer ends eye portions 12$^b$, adapted to receive a wire or a rope 13, which bolts, in the form thereof shown in Figs. 1 to 4 of the drawings, are embedded in the resilient tire T, the ends of said wire being connected by a turnbuckle 14, engaging right and left hand screw-threads 13' and 13'', respectively, so that the tire T may be firmly held in place on the metal tire 11 by inserting said bolts in the usual bolt-holes and drawing them down by the nuts 20, the wire 13 being prevented from displacement by the arrangement of said bolts closely together, as shown.

In Fig. 4 the tire is represented in its original or molded form, the base-line thereof being slightly concaved, as at 15, so that when the ends of the wire 13 are drawn together said wire is tightened and the side portions 16 of the resilient tire are forced into close contact with the metal tire 11, which will thus prevent water or dirt (which would prove detrimental to the "life" thereof) from entering under the resilient tire, and in order to reinforce the base of said tire and also to provide side guards or flanges to prevent the entrance of foreign matter, as above mentioned, a strip of canvas or similar material 17 is cemented or otherwise united with the tire, the edges of said strip being turned around the side portions 16 to form flanges 16', as clearly shown in Figs. 3 and 4.

From the above it will be understood that when a wheel of ordinary construction is to be provided with a resilient tire the bolts which were employed to retain the metal tire of the wheel in place are removed therefrom and the bolts 12, strung on the wire 13 by their eyes 12$^b$, are placed in the bolt-holes in the metal tire and in the felly and secured therein by the nuts 20, above mentioned, in such a manner that in the latter instance both the resilient tire and the metal tire are retained in place on the felly thereby. Arranged in proximity with the main wire 13 are the side wires 18, one on each side thereof, adapted to be tightened by turnbuckles 19, in engagement with right and left hand screw-threads 18' 18'', respectively, formed at the ends thereof, so that the wires 18 may serve as additional means for retaining the tire T in position and for forming a close contact between the side portions 16 thereof and the metal tire 11, above referred to.

In Fig. 5 of the drawings is illustrated a modification of my invention, the wire 13' being clamped against the metal tire 11, independently of the resilient tire T', by the bolts 12', which may, if preferred, have their outer ends hook-shaped, as indicated by dotted lines 12'', and the tire T' is in this instance channeled to fit over the wire 13′, while the side wires 18 are employed for holding said resilient tire in place, as will be readily understood.

In applying the improved resilient tire to a wheel the operation is as follows, viz: A strip of resilient tire T, cut to proper length and having a longitudinal aperture for the reception of the main wire 13, and preferably provided with the side wires 18, is positioned on the metal tire of the wheel, and the former retaining-bolts are replaced by the eyebolts 12. The eyes of said bolts are sunk into recesses located at the proper points in the bottom of the tire T until they are in such position that the wire 13 may be passed through the same, after which procedure the ends of the main and side wires are drawn together by their respective turnbuckles, and subsequently the nuts 20 are tightened to the desired extent. It is also feasible to mold the resilient tire around the wire 13 and the heads of the bolts 12, thereby forming a salable article, with bolts attached in readiness to be applied in the usual bolt-holes of any ordinary metallic tire.

In the form shown by Fig. 5 the wire or rope 13′ is first secured to the metal tire by the hook-ended bolts 12′ 12″, and the resilient tire is then tightened over said wire by the right and left threaded connections 18′ 18″ and turnbuckles 19 until the hook-shaped ends 12″ are sunk either in a groove in said rubber tire or in the surface of the same, when they will prevent the lateral movement thereof. In this form of the invention the wire 13′ is also sunk either in a groove of the rubber tire or in the substance thereof, as shown, and it also prevents the said tire from lateral movement or displacement.

While the invention is shown preferably applied to a wheel having a metal tire, yet it is not limited thereto, as it is feasible to employ it in other relations or for securing the resilient tire to the felly.

Having thus described my invention, what I claim, and desire to secure by Letters Patent, is—

1. The combination, with a wheel, of a resilient tire provided with a channel; bolts adapted to be inserted in the usual tire bolt-holes of the felly, said bolts being provided with eyes adapted to enter the channel in the under side of the tire; a wire passing through said eyes and channel; wires passing through perforations on each side of the channel; and means for tightening all of said wires.

2. The combination, with a wheel, of a resilient tire provided with a channel, and bolts adapted to be inserted in the usual tire bolt-holes of the felly, said bolts being provided with eyes adapted to receive a wire and clamp it in contact with the metallic tire throughout the circumference thereof, the bolts and wire engaging the channel in the tire.

3. The combination, with a wheel, of a resilient tire provided with a channel, and bolts adapted to be inserted in the usual tire bolt-holes of the felly, said bolts being provided with hooks adapted to receive a wire and clamp it in contact with the felly or tire throughout the circumference thereof, the bolts and wire engaging the channel in the tire.

4. The combination, with a wheel, of a resilient tire provided with a channel; bolts adapted to be inserted in the usual tire bolt-holes of the felly, said bolts being provided with eyes adapted to receive a wire and clamp it in contact with the felly or tire throughout the circumference thereof, the bolts and wire engaging the channel in the tire; wires or cords passing through perforations on each side of the channel; and means for tightening all of said wires.

WILLIAM H. TUTTLE.

Witnesses:
CHARLES R. WINCHESTER,
HENRY BISSELL.